Nov. 4, 1958  B. A. DAVIES  2,858,757
DISK GANG AND MOUNTING THEREFOR
Filed Sept. 12, 1955  2 Sheets-Sheet 1
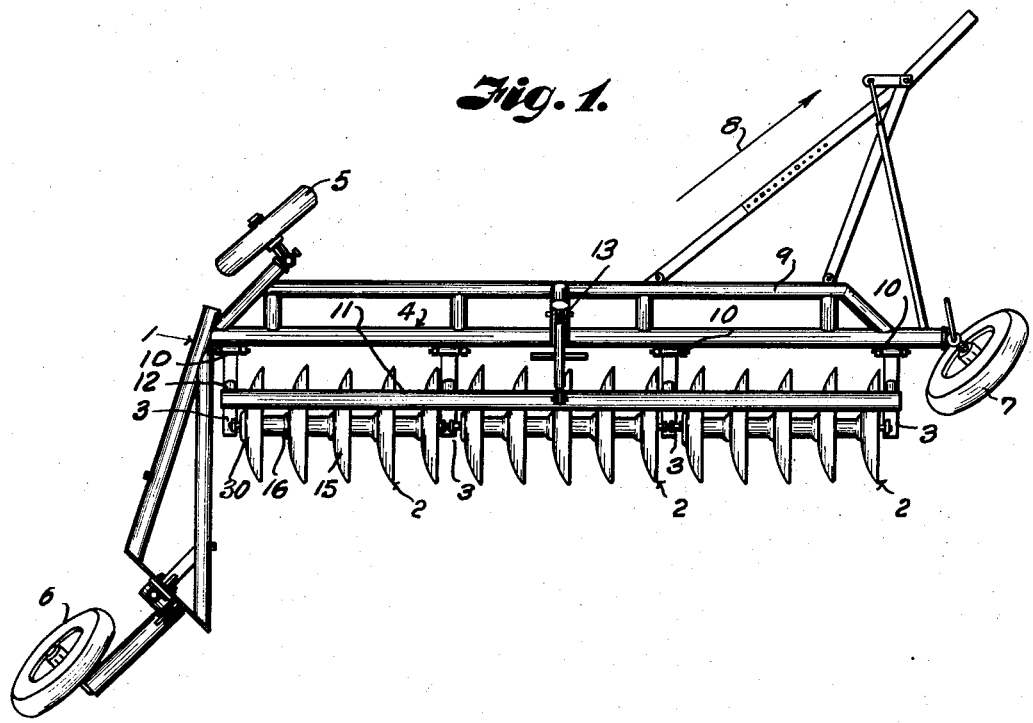
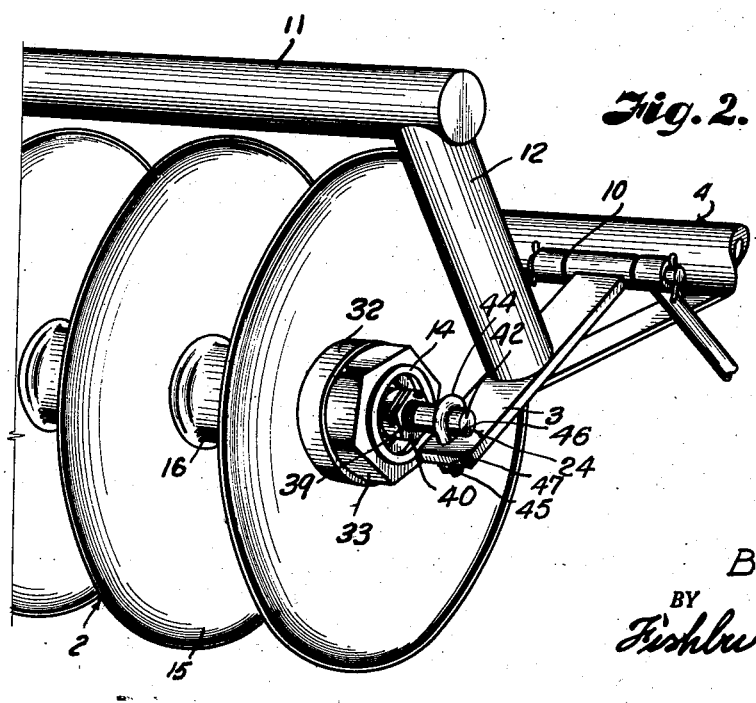
INVENTOR.
Boyd A. Davies.
BY
Fishburn & Mullendore
ATTORNEYS.

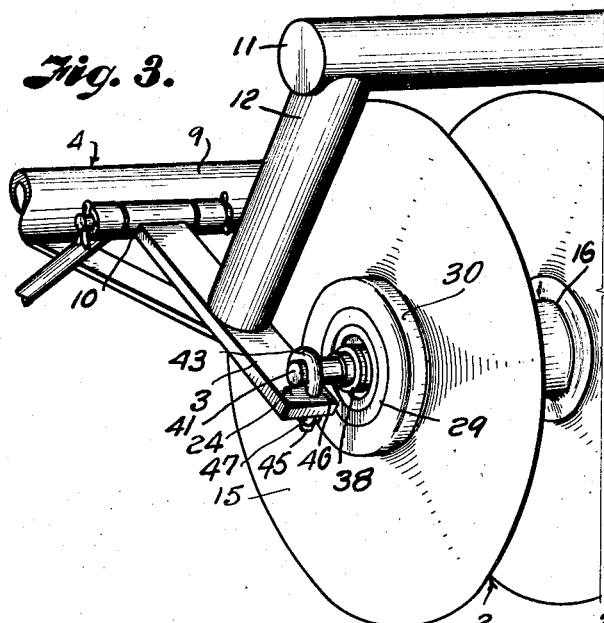

United States Patent Office 2,858,757
Patented Nov. 4, 1958

2,858,757

DISK GANG AND MOUNTING THEREFOR

Boyd A. Davies, Pratt, Kans.

Application September 12, 1955, Serial No. 533,811

2 Claims. (Cl. 97—54)

This invention relates to a disk gang and mounting therefor of the type used in one-way plows, disk harrows and similar working machines.

In machines of this character, the disks are carried in properly spaced apart relation on a tube or barrel that is rotatable on an axle-shaft by means of anti-friction bearings. The bearings operate under adverse conditions, in that they are subject to severe end thrust under the abrasive action of dust and dirt which enters through the usual seals at the ends of the barrel on which the disks are carried.

Prior to the present invention the bearings have been protected by inseating them within the ends of the barrel a sufficient distance to accommodate adjustment means and seals which are pressed within the end of the barrel and form a seal directly upon the axle-shaft. Therefore, the adjusting means for the bearings are completely enclosed within the ends of the tubular shaft by the oil seals. Another difficulty is that the axle-shaft must be supported by fixed brackets that are located, as nearly as possible, to the endmost disk of the assembly so that the shaft is as short and rigid as possible. It is, therefore, obvious that the adjustment means for the bearings is inaccessible without complete removal of the disk assembly from the supporting brackets. Even then the seals must be removed and the adjustment means cleaned of lubricant before the adjusting is accessible for manipulation by a specially designed wrench.

It is, therefore, the principal object of the present invention to provide a disk gang and bearing mounting which is readily accessible and easily adjusted by means of a conventional wrench without removal of the disk gang from the machine.

A further object of the invention is to provide a structure wherein the dust and oil seal is located between the bearing and the bearing adjusting means with the adjusting means projecting from the end of the barrel so that it is readily accessible through the space between the end of the gang and the supporting bracket.

A further object of the invention is to provide a simple, inexpensive construction which results in a rigid disk gang.

In accomplishing these and other objects of the invention, as hereinafter pointed out, I have provided improved structure, the preferred form of which is illustrated in the accompanying drawings, wherein:

Fig. 1 is a plan view of a one-way plow equipped with disk gangs and bearing mountings embodying the features of the present invention.

Fig. 2 is a fragmentary, perspective view of one end of a disk gang showing the support thereof from the plow frame and illustrating the easy access to the bearing adjusting means.

Fig. 3 is a similar view of the opposite end of the disk gang.

Fig. 4 is an enlarged but shortened longitudinal section of the disk gang and mounting therefor.

Fig. 5 is an enlarged fragmentary section of the bearing, adjusting means therefor, and the sealing ring.

Fig. 6 is an enlarged, fragmentary section showing a modified form of bearing.

Referring more in detail to the drawings:

1 designates an earth working machine. For example, a one-way plow which utilizes one or more disk gangs 2 that are carried between arms or brackets 3 on a frame 4. The frame 4 is carried by a land wheel 5, a rear furrow wheel 6, and a front furrow wheel 7 arranged angularly with respect to the rotational axis of the disk gangs and whereby the disk gangs are held on an angle with respect to the line of travel, as indicated by the arrow 8. The frame 4 includes a main transverse section 9 for pivotally supporting the arms 3 therefrom, as indicated at 10, the arms 3 being spaced along the length of the section 9 to carry the disk gangs therebetween, as shown in Fig. 1. The arms 3 are all interconnected to hold the disk gangs in substantially rigid end to end alignment by means of a cross beam 11 carried above the disk gangs on uprights 12 that are fixed to the respective arms 3, as best shown in Figs. 2 and 3. The disk gangs are raised and lowered with respect to the frame 4 by a jack mechanism 13 that connects the main section 9 of the frame with the cross beam 11. The structure thus far described, is common to one-way plows and specifically forms no part of the present invention.

The present invention contemplates an improved disk gang assembly and mounting therefor, whereby the bearings are readily adjustable without removal of the disk gangs from their supporting arms.

In carrying out the invention, each disk gang assembly includes an elongated tube or barrel 14 of sufficient length to mount thereon the desired number of disks 15 and spacers 16 which provide the desired spacing between the respective disks.

The barrel 14 has a sufficiently thick wall 17 (Fig. 4) to provide the desired rigidity and to permit counter boring of the ends of the barrels, to provide inset internal shoulders 18 and 19 for seating the marginal edges of bearing retainer washers 20 and 21, each having central openings 22 and 23 for passing the axle shaft 24 therethrough, as later described.

Inset within each counter bore and bearing on the washers 20 and 21 is an outer race 25 of anti-friction bearings 26 and 27. The counter bores are of sufficient depth to accommodate the outer races 25, and oil seals 28 that are pressed within the open ends of the barrel, as later described.

Fixed to one end of the barrel is a collar 29 to seat an abutment washer 30 for backing the first of the concave-convex disks 15, having axial openings 31 to accommodate the barrel when disks are threaded thereover in alternating order with the spacers 16. Bearing against the endmost disk 15 at the opposite end of the assembly is a washer 32 that is backed by a clamping nut 33 which is threaded upon the end of the barrel.

The anti-friction bearings 26 and 27 also include inner races 35 and 36, respectively, which are slidably movable on the axle shaft 24 to adjust anti-friction rollers 37 with respect to outer races when the disk gangs are mounted, as later described.

The axle shaft 24 of each disk gang is of a length to project from the ends of the barrel 14 to mount a stop collar 38 at one end and to provide threads 39 at the other for an adjusting nut 40, the collar 38 being preferably welded to the axle-shaft. The axle-shaft also has reduced extensions 41 and 42 which overlap the arms 3 to be secured thereto by fasteners, such as U bolts 43 and 44. The U bolts straddle the extensions 41 and 42 and have the threaded shanks 45 passing through openings 46 in the arms to mount nuts 47 by which the U bolts draw the ends of the axle-shaft securely against the ends of the arms 3.

In order to accommodate the bearing seals, a spacing collar 48 is inserted between the inner race 35 and collar 38 and a similar spacer 49 is inserted between the inner race 36 and the adjusting nut 40. The spacing washers are of sufficient width so that the annular faces thereof are engaged by the inner peripheries of the sealing rings 28. The nut 40 is thus located so that it is readily accessible through the relatively narrow space between the end of the barrel 14 and the adjacent arm 3.

In the illustrated instance, the nut 40 has slot 50 extending through one side thereof so as to form flexible portions 51 and 52 on the respective sides of the slot and which are adapted to be moved apart on the threads 39 by means of a set screw 53 (Fig. 5), the set screw being threaded in an opening of an outer flexible portion 52, and having its end bearing against the slot side of the other flexible portion 51, as shown in Fig. 4. The nut is, therefore, locked on the threads when in an adjusted position.

Instead of providing the spacers, the inner bearing races may have integral extensions 54, as shown in Fig. 6.

In assembling the disks, they are mounted on the respective barrels 14 as in conventional practice. The antifriction bearings 26 and 27 are then inserted within the counter bores at the end of each barrel together with the washers 20 and 21. When in position, the marginal edges of the washers seat against the inner shoulders 18 and 19 and the outer races of the bearings seat against the outer faces of the washers to leave space for the sealing rings 28. The sealing rings 28 are then pressed into the open ends of the barrel to close the space around the spacing washers 48 and 49 so as to retain lubricant within the bearings and prevent infiltration of dust and dirt. An axle shaft 24 is then inserted with the threaded end thereof being passed through the inner race 35 of the bearing 26 at the collar end of the barrel 14 and then through the inner race 36 at the opposite end to seat the collar 38 against the washer 48 and the washer 48 against the inner race of the bearing 26 and to project the threaded end 39 at the opposite end of the assembly. The nut 40 is then applied and tightened to properly adjust the fit of the bearings for supporting the assembly on the axle-shaft. The axle shaft of each assembly is then placed in position on the arms 3 with the reduced ends 41 and 42 seating on the arms 3 between the openings 46. The U bolts are then inserted over the extensions and secured on application of the nuts 47 to the threaded shanks 45 thereof. The bearings may have been previously packed with a lubricant prior to assembly or the bearings may be supplied with a lubricant by means of conventional type of grease fitting, not shown.

When the plow has been in use and it becomes necessary to readjust the disk gangs on the respective axle shafts, the adjustments are readily effected without removal of the gangs, it being only necessary to loosen the set screw 53 for the respective nuts 40, insert a conventional wrench through the space between the adjacent disks and the arms 3 and turn the nut in the proper direction to tighten the inner races of the bearings within the outer races, after which the set screw is retightened to lock the nuts in adjusted position.

It is thus obvious that the adjustments are readily effected without removal of the bearing seals or any other part of the assembly.

What I claim and desire to secure by Letters Patent is:

1. In a disk gang plow including a frame, spaced apart arms projecting from the frame, a tubular shaft between said arms and of shorter length than the space between said arms to provide a space therebetween at ends of the tubular shaft, an axle shaft extending coaxially through the tubular shaft and having ends projecting from the ends of the tubular shaft for support by said arms, clamps for securing said ends of the axle shaft to said arms, plow disks on the tubular shaft, said tubular shaft having counterbores in the ends thereof to provide inset annular shoulders, antifraction bearings in said counterbores having outer races abutting said shoulders and having inner races movable axially on said axle shaft, spacers on said axle shaft abutting outer ends of the inner races and extending outwardly to near ends of the tubular shaft, annular sealing elements inset in said bores of the tubular shaft and having peripheral sealing contact with walls of the bores and with the peripheries of said spacers, an annular stop fixed to one projecting end of the axle shaft and having abutment with the outer end of the spacer at that end of the axle shaft, said other projecting end of the axle shaft having a threaded portion thereon extending from the outer end of the spacer and terminating short of the arm at that end of the tubular shaft, and a nut on said threaded portion separate from said clamp and spaced from the arm which supports that end of the shaft to cooperate with the annular stop at the opposite end of the shaft for adjusting the inner races of the antifriction bearings relative to the outer races, said space between the terminal end of the tubular shaft and said arm providing access to said nut for said adjustment without loosening said clamp.

2. In a disk gang plow including a frame, spaced apart arms projecting from the frame, a tubular shaft between said arms and of shorter length than the space between said arms to provide a space therebetween at ends of the tubular shaft, an axle shaft extending coaxially through the tubular shaft and having ends projecting from the ends of the tubular shaft across said spaces and terminating in reduced extensions for support by said arms, clamps for securing said reduced extensions of the axle shaft to said arms, plow disks on the tubular shaft, said tubular shaft having counterbores in the ends thereof to provide inset annular shoulders, antifriction bearings in said counterbores having outer races abutting said shoulders and having inner races movable axially on said axle shaft, spacers on said axle shaft abutting outer ends of the inner races and extending outwardly to near ends of the tubular shaft, annular sealing elements inset in said bores of the tubular shaft and having peripheral sealing contact with walls of the bores and with the peripheries of said spacers, an annular stop fixed to one projecting end of the axle shaft and having abutment with the outer end of the spacer at that end of the axle shaft, said other projecting end of the axle shaft having a threaded portion thereon extending from the outer end of the spacer and terminating short of the arm at that end of the tubular shaft, and a nut on said threaded portion separate from said clamp and spaced from the arm which supports that end of the shaft to cooperate with the annular stop at the opposite end of the shaft for adjusting the inner races of the antifriction bearings relative to the outer races, said space between the terminal end of the tubular shaft and said arm providing access to said nut for said adjustment without loosening said clamp.

References Cited in the file of this patent

UNITED STATES PATENTS

| | | |
|---|---|---|
| 171,898 | Wiles | Jan. 4, 1876 |
| 2,135,192 | Mitchell et al. | Nov. 1, 1938 |
| 2,176,294 | Cox | Oct. 17, 1939 |
| 2,189,685 | Stevenson | Feb. 6, 1940 |
| 2,256,220 | Sjogren | Sept. 16, 1941 |
| 2,586,490 | Thompson | Feb. 19, 1952 |
| 2,727,448 | Taylor | Dec. 20, 1955 |